United States Patent
Ip

(10) Patent No.: US 8,661,299 B1
(45) Date of Patent: Feb. 25, 2014

(54) DETECTING ABNORMALITIES IN TIME-SERIES DATA FROM AN ONLINE PROFESSIONAL NETWORK

(71) Applicant: LinkedIn Corporation, Mountain View, CA (US)

(72) Inventor: Man Wai Ip, San Jose, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 13/907,540

(22) Filed: May 31, 2013

(51) Int. Cl.
*G06F 11/00* (2006.01)

(52) U.S. Cl.
USPC ........... 714/47.3; 714/26; 714/47.1; 702/185; 702/187

(58) Field of Classification Search
USPC ............ 714/26, 37, 47.1, 47.3; 702/179, 183, 702/185, 186, 187
See application file for complete search history.

(56) References Cited

U.S. PATENT DOCUMENTS

| | | | | |
|---|---|---|---|---|
| 7,409,316 B1 * | 8/2008 | Saghier et al. | ................ | 702/182 |
| 7,954,090 B1 * | 5/2011 | Qureshi et al. | ................ | 717/127 |
| 2003/0014692 A1 * | 1/2003 | James et al. | .................... | 714/25 |
| 2005/0216793 A1 * | 9/2005 | Entin et al. | ....................... | 714/38 |
| 2006/0215564 A1 * | 9/2006 | Breitgand et al. | ............. | 370/241 |
| 2006/0293777 A1 * | 12/2006 | Breitgand et al. | ............. | 700/108 |
| 2008/0016412 A1 * | 1/2008 | White et al. | .................... | 714/48 |
| 2008/0148180 A1 * | 6/2008 | Liu et al. | ....................... | 715/800 |
| 2008/0235365 A1 * | 9/2008 | Bansal et al. | ................. | 709/224 |
| 2010/0083055 A1 * | 4/2010 | Ozonat | .......................... | 714/47 |
| 2011/0098973 A1 * | 4/2011 | Seidman | ....................... | 702/179 |
| 2011/0154131 A1 * | 6/2011 | Roney et al. | .................... | 714/49 |
| 2011/0185235 A1 * | 7/2011 | Iizuka | .......................... | 714/47.3 |
| 2011/0276836 A1 * | 11/2011 | Kahana et al. | ............... | 714/38.1 |
| 2012/0151276 A1 * | 6/2012 | Bjorner et al. | ............... | 714/47.1 |
| 2012/0192014 A1 * | 7/2012 | Kato | ............................ | 714/47.1 |

* cited by examiner

*Primary Examiner* — Marc Duncan
(74) *Attorney, Agent, or Firm* — Park, Vaughan, Fleming & Dowler LLP

(57) ABSTRACT

The disclosed embodiments relate to a system for detecting abnormalities in time-series performance data obtained from machines that implement an online professional network. During operation, the system receives the time-series data, including throughput measurements and/or latency measurements for requests made to back-end systems associated with the online professional network. Next, the system attempts to detect abnormalities in the time-series data. If such an abnormality is detected, the system looks up associated system metrics, which are temporally proximate to the abnormality. The system then generates a notification about the abnormality along with the associated system metrics to facilitate determining a root cause of the abnormality.

19 Claims, 5 Drawing Sheets

DETECTING ABNORMALITIES IN TIME-SERIES DATA FROM AN ONLINE PROFESSIONAL NETWORK

RELATED ART

The disclosed embodiments generally relate to techniques for analyzing performance metrics in online professional networks. More specifically, the disclosed embodiments relate to a system that detects abnormalities in time-series data collected from systems that provide access to an online professional network.

BACKGROUND

Perhaps the most significant development on the Internet in recent years has been the rapid proliferation of online social networks, such as LinkedIn™ and Facebook™. Billions of users are presently accessing such social networks to connect with friends and acquaintances and to share personal and professional information. In order to be successful, such online social networks need to provide reliable performance. This can be challenging because the underlying infrastructure that supports such online social networks typically comprises a large number of interconnected front-end and back-end systems. A performance problem in any one of these underlying systems can potentially affect the performance of the online social network.

Hence, to provide reliable performance in online social networks, system administrators need to carefully monitor performance data to quickly identify and alleviate performance problems before they escalate.

DESCRIPTION

Figure 1:
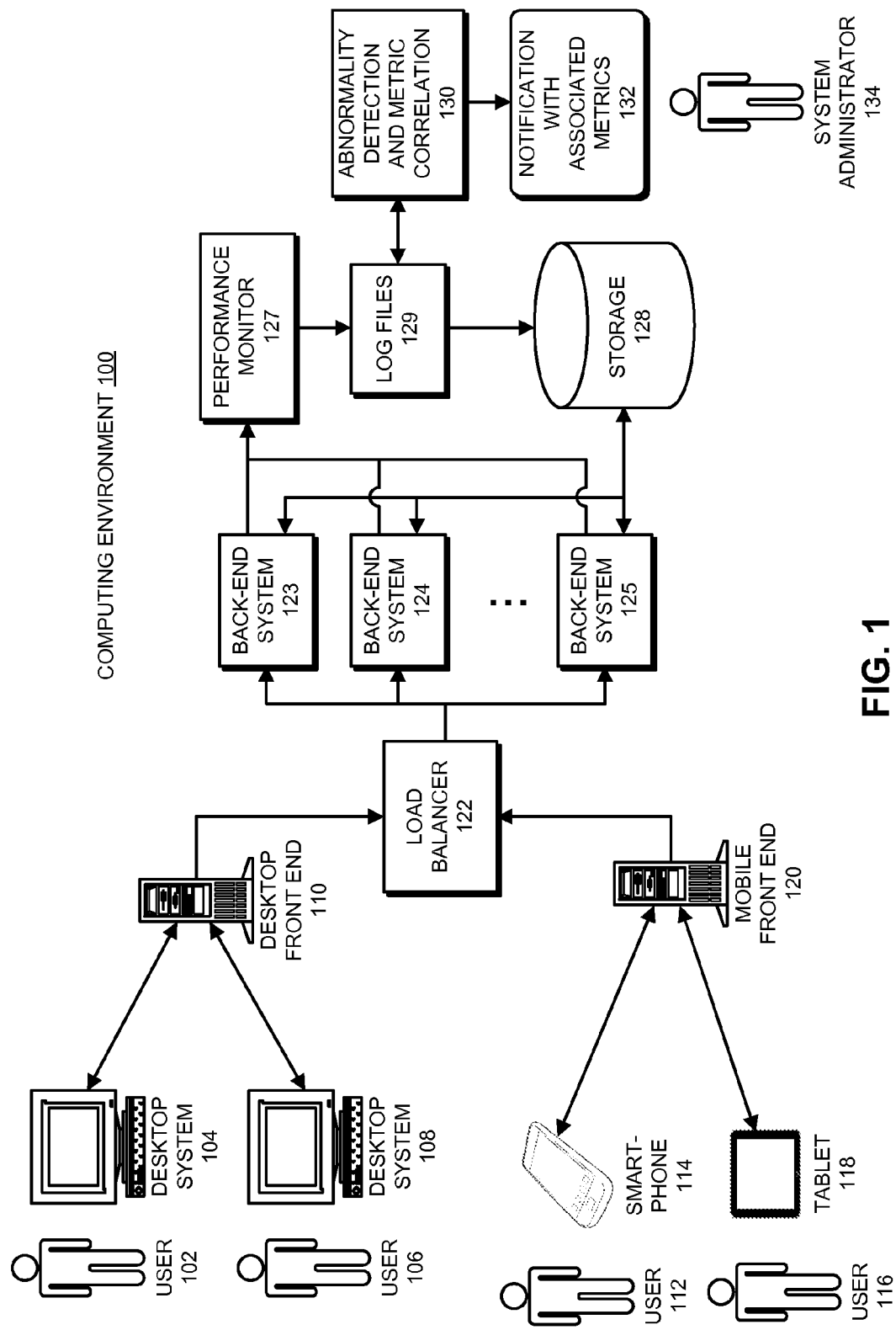
FIG. 1 illustrates a computing environment in accordance with the disclosed embodiments.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments relate to a system for detecting abnormalities in time-series performance data obtained from machines that implement an online professional network. During operation, the system receives the time-series data, including throughput measurements and/or latency measurements for requests made to back-end systems associated with the online professional network. Next, the system attempts to detect abnormalities in the time-series data. If such an abnormality is detected, the system looks up associated system metrics, which are temporally proximate to the abnormality. The system then generates a notification about the abnormality along with the associated system metrics to facilitate determining a root cause of the abnormality.

Before we describe the details of this technique, we first describe an exemplary computing environment in which such a system can operate.

Computing Environment

FIG. 1 illustrates an exemplary computing environment 100 for an online professional network (such as LinkedIn™) in accordance with the disclosed embodiments. As illustrated in FIG. 1, the online professional network can be accessed through browsers in desktop systems (104 and 108) that interact with a website for the online professional network. Alternatively, the online professional network can be accessed through mobile applications that act as gateways to an online professional network from associated mobile devices, including a smartphone 114 and a tablet computer 118.

More specifically, desktop systems 104 and 108 include browsers (not shown) which are operated by users 102 and 106, respectively. Desktop systems 104 and 108 can generally include any type of computer system that can interact with the online professional network through a browser. For example, desktop systems 104 and 108 can include a personal computer system, a server computer system, or even a laptop computer system. During operation, browsers in desktop systems 104 and 108 interact with a desktop front end 110, wherein desktop front end 110 provides services that make requests to various back-end systems 123-125 as is described in more detail below. Although only one desktop front end 110 is illustrated in FIG. 1, in general computing environment 100 can include a large number of desktop front ends. This enables the online professional network to simultaneously interact with thousands or even millions of users.

Mobile devices 114 and 118, which are operated by users 112 and 116, respectively, can generally include any type of portable electronic device that can interact with the online professional network through a mobile application. For example, these portable electronic devices can include a smartphone, a tablet computer, a network-connected music player, a gaming console and possibly a laptop computer system.

As mentioned above, mobile devices 114 and 118 execute mobile applications that function as portals to the online professional network. Although the illustrated embodiment shows only two mobile devices 114 and 118, in general computing environment 100 can include a large number of mobile devices and associated mobile application instances (possibly thousands or millions) that simultaneously access the online professional network.

These mobile applications interact with the online professional network through mobile front end 120, wherein mobile front end 120 includes services that make requests to various back-end systems 123-125 as is described in more detail below. Computing environment 100 can generally include a large number of mobile front-end systems, and is not limited to a single mobile front-end system 120 as is illustrated in FIG. 1. Moreover, mobile devices 114 and 118 communicate with mobile front end 120 through one or more networks (not shown), such as a Wi-Fi® network, a Bluetooth™ network or a cellular data network.

During operation, users 102 and 106 of desktop systems 104 and 108, respectively, perform various actions while interacting with the online professional network through a browser-based interface. For example, these actions can include: downloading the user's home page, sending an email message to another user, editing the user's personal profile page, or searching for a specific user. These actions cause services in desktop front end 110 to generate requests, which are sent to back-end systems 123-125 through load balancer 122.

Similarly, users 112 and 116 of portable electronic devices 114 and 118, respectively, perform various actions while interacting with the online professional network through associated mobile applications. These actions cause services in mobile front end 120 to generate requests, which are sent to back-end systems 123-125 through load balancer 122.

Requests from desktop front end 110 and mobile front end 120 are sent to load balancer 122, which decides which back-end system will receive each request. This decision can be based on a number of factors, including the load on each back-end system 123-125 and the priority of each request relative to other requests. For example, if a particular back-end system 123 is lightly loaded and other back-end systems 124 and 125 are more heavily loaded, load balancer 122 can decide to send the next request to back-end system 123.

The relative priority of requests can also affect how load balancer 122 directs requests. Some requests are relatively low priority, such as requests associated with background tasks that perform data-mining operations, whereas other requests are higher priority, such as a request to load a home page for a waiting user. Load balancer 122 can direct higher priority tasks to lightly loaded back-end systems, and can ensure that these back-end systems, which are running the higher priority tasks, remain lightly loaded. Conversely, load balancer 122 can direct lower-priority tasks to more highly loaded back-end systems, which are processing other lower-priority tasks.

During operation, back-end systems 123-125 service requests received from load balancer 122, which can involve accessing non-volatile storage 128, such as disk drives or solid-state storage. While back-end systems 123-125 are servicing these requests, a performance monitor 127 gathers performance-related metrics from back-end systems 123-125. Performance monitor 127 stores these performance-related metrics in log files 129, which are stored in non-volatile storage 128.

These performance-related metrics can include top-line metrics, such as the throughput and latency for requests being processed by each back-end system. They can also include other system-level metrics, such as: central-processing unit (CPU) usage, memory utilization, traffic to disk, active thread count, garbage-collection activity, heap utilization and network traffic.

While performance monitor 127 is operating, a special module 130, which performs abnormality detection and metric correlation operations, generates a notification and associated metrics 132, which are sent to a system administrator 134. For example, in response to detecting an abnormality associated with a dip in throughput for a back-end system, module 130 can use a timestamp associated with the abnormality to scan log files containing the other system metrics to identify metric values that are temporally proximate to the abnormality. Module 130 assumes that temporally proximate metric values are likely to be correlated with the abnormality, which can help the system administrator determine the root cause of the abnormality.

In response to notification 132, system administrator 134 can take various remedial actions. For example, if a back-end system 124 starts experiencing high latencies in servicing requests, system administrator 134 can take back-end system 124 offline and can migrate all threads that are executing on back-end system 124 to another back-end system. In some embodiments, each back-end system has a mirrored slave back-end system. In these embodiments, the migration of tasks to the slave back-end system can be almost instantaneous.

Exemplary Services

Figure 2:
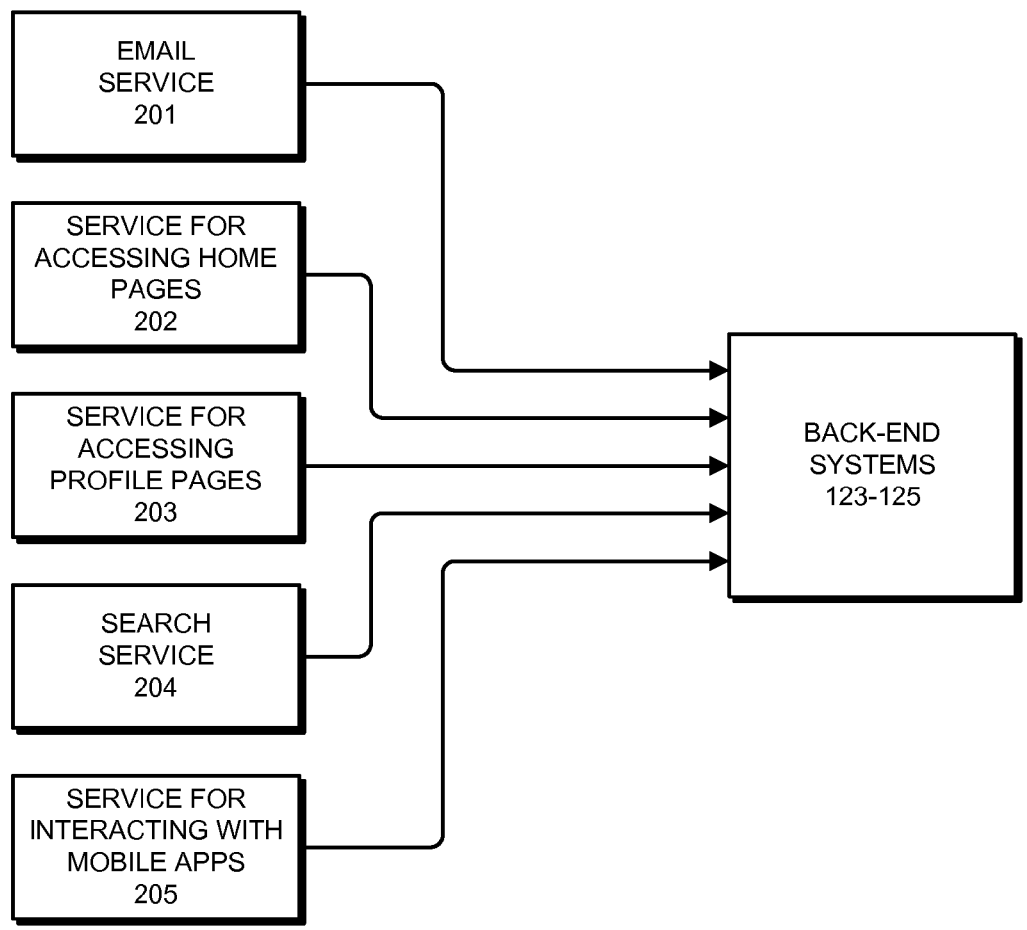
FIG. 2 illustrates exemplary services that can interact with a back-end system in accordance with the disclosed embodiments.

FIG. 2 illustrates exemplary services that can interact with back-end systems 123-125 in accordance with the disclosed embodiments. As mentioned above, when users interact with the online professional network, they make calls to various services 201-205 within desktop front end 110 and mobile front end 120. These services 201-205 in turn make requests to back-end systems 123-125 through load balancer 122. Note that a large number of services exist that can possibly make requests to back-end-systems 123-125, and these services are not meant to be limited to the exemplary services illustrated in FIG. 2.

As illustrated in FIG. 2, these services can include an email service 201, which enables users who are members of the online professional network to exchange emails with other members, and possibly to exchange emails with other individuals who are not affiliated with the online professional network.

The services can also include a service for accessing home pages 202. This service 202 is responsible for constructing and rendering a home page for a specific user of the online professional network.

The services can additionally include a service for accessing profile pages 203. This service 203 performs operations that enable a user to access his or her profile page, which can involve simply viewing the profile page or editing the profile page.

The services can also include a search service 204, which enables a user of the online professional network to search for other users. Search service 204 can also enable the user to search through profile pages of the user's contacts looking for specific keywords.

Finally, the services can include a service that interacts with mobile applications 205. This service generally processes requests that originate from mobile applications that reside on various portable electronic devices.

Detecting Abnormalities

Figure 3:
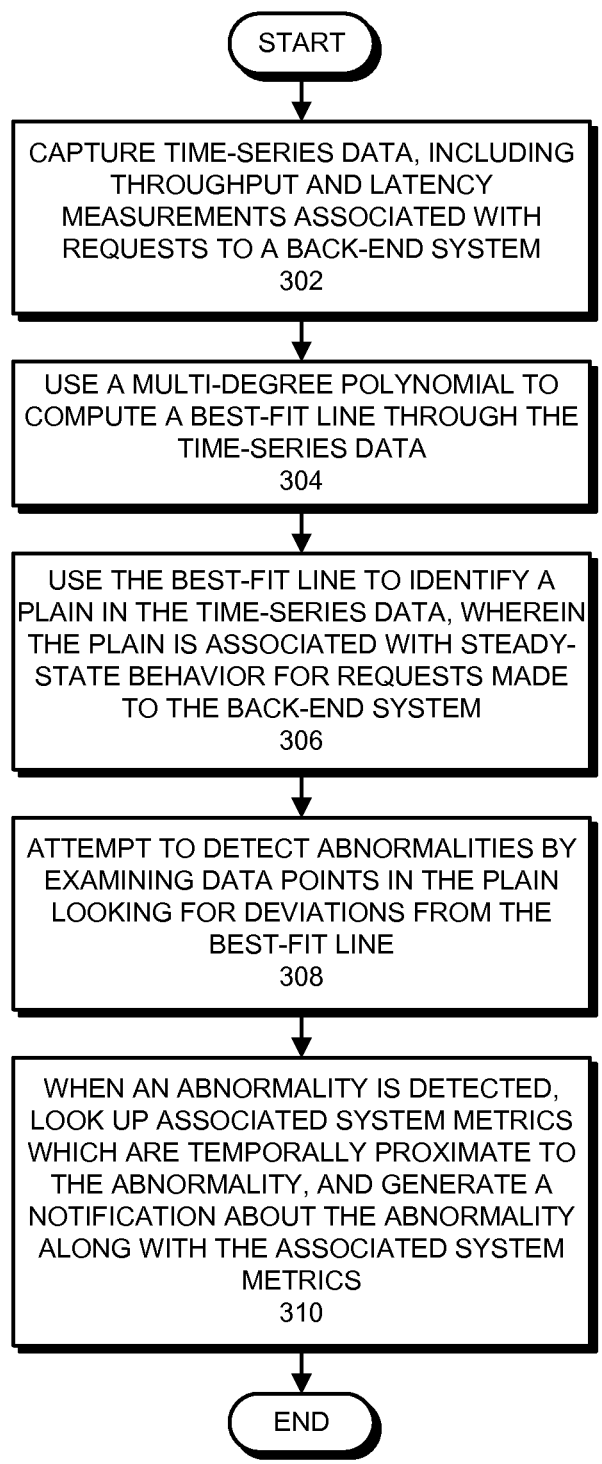
FIG. 3 presents a flow chart illustrating the process of detecting abnormalities in time-series data in accordance with the disclosed embodiments.

FIG. 3 presents a flow chart illustrating the process of detecting abnormalities in time-series data in accordance with the disclosed embodiments. This process is performed by module 130 from FIG. 1, which is responsible for detecting abnormalities and correlating the abnormalities with associated metrics. During operation, the system receives time-series data, including throughput measurements and latency measurements associated with requests made to a back-end system (step 302).

Next, the system uses a multi-degree polynomial to compute a best-fit line through the time-series data (step 304). A large number of possible ways exist to perform such curve fitting. For example, a standard regression analysis technique can be used to obtain a best-fit line. Also, the curve-fitting process can seek to minimize some objective function, such as a "least squares" approach that seeks to minimize the sum of squares of the differences between the data points and the best-fit line. In addition, the polynomial can be a second-degree polynomial or higher. For example, the polynomial can be a second-degree, third-degree, fourth-degree, or even tenth-degree polynomial.

Next, the system uses the best-fit line to identify a plain in the time-series data, wherein the plain is associated with steady-state behavior for requests to the back-end system (step 306). This plain can be defined in a number of ways. For example, to detect when the plain starts during a transitory startup period, the system can periodically look at the best-fit line representing throughput and can determine the increase in throughput among consecutive measurements. If the increase in throughput falls below a threshold amount (say 5%), the system can determine that a plain has started. At a later time, when the back-end system is shutting down, if the throughput drops by more than a threshold amount (5%) among consecutive measurements, the system can determine that the plain has ended.

Next, the system attempts to detect abnormalities by examining data points in the plain looking for deviations from the best-fit line (step 308). These abnormalities can be defined in a number of different ways. For example, an abnormality can be defined as an absolute numerical deviation, such as the latency for a processing request increasing by 1 second. An abnormality can also be defined as a percentage change, such as a 10% increase in latency. An abnormality can also be defined in terms of a standard deviation for data points in the time-series data. For example, an abnormality can be defined as a latency that falls outside of a second standard deviation from the best-fit line.

Also, the type of deviation that constitutes an abnormality can depend on which top-line metric is being measured. For example, if the top-line metric is throughput, a significant dip in throughput can cause problems, whereas an increase in throughput is not a problem. Hence, a dip in throughput that exceeds a threshold can be considered an abnormality, while an increase in throughput is not considered an abnormality. On the other hand, if the top-line metric is latency, a significant increase in latency can cause problems, whereas a drop in latency is not a problem. Hence, an increase in latency that exceeds a threshold can be considered an abnormality, while a decrease in latency is not considered an abnormality.

Next, when an abnormality is detected, the system looks up associated system metrics that are temporally proximate to the abnormality. As mentioned above, this can involve using a timestamp associated with the abnormality to scan log files containing the system metrics to identify metric values that are temporally proximate to the abnormality. Recall that the system metrics can include: CPU usage, memory utilization, traffic to disk, active thread count, garbage-collection activity, heap utilization and network traffic.

Finally, the system generates a notification about the abnormality along with the associated system metrics to facilitate determining a root cause of the abnormality (step 310). For example, suppose the system generates a notification when the latency for servicing requests at a back-end system dramatically increases. The system administrator can examine the system metrics and can determine that the back-end system is running short of heap space. The system administrator can then take steps to increase the amount of heap space that is allocated to the back-end system.

In another case, if the system metrics indicate that garbage collection is taking place when the latency spikes, the system administrator can determine that the latency increase is caused by the garbage collection. In response, the system administrator can take steps to reduce the number of requests that are sent to a back-end system that is performing the garbage-collection operation.

In another case, if the system metrics indicate that periodic operating system kernel flushes are causing spikes in latency, the system administrator can take steps to decrease the frequency of such kernel flushes during peak load periods for the online professional network.

Throughput Graph

Figure 4A:
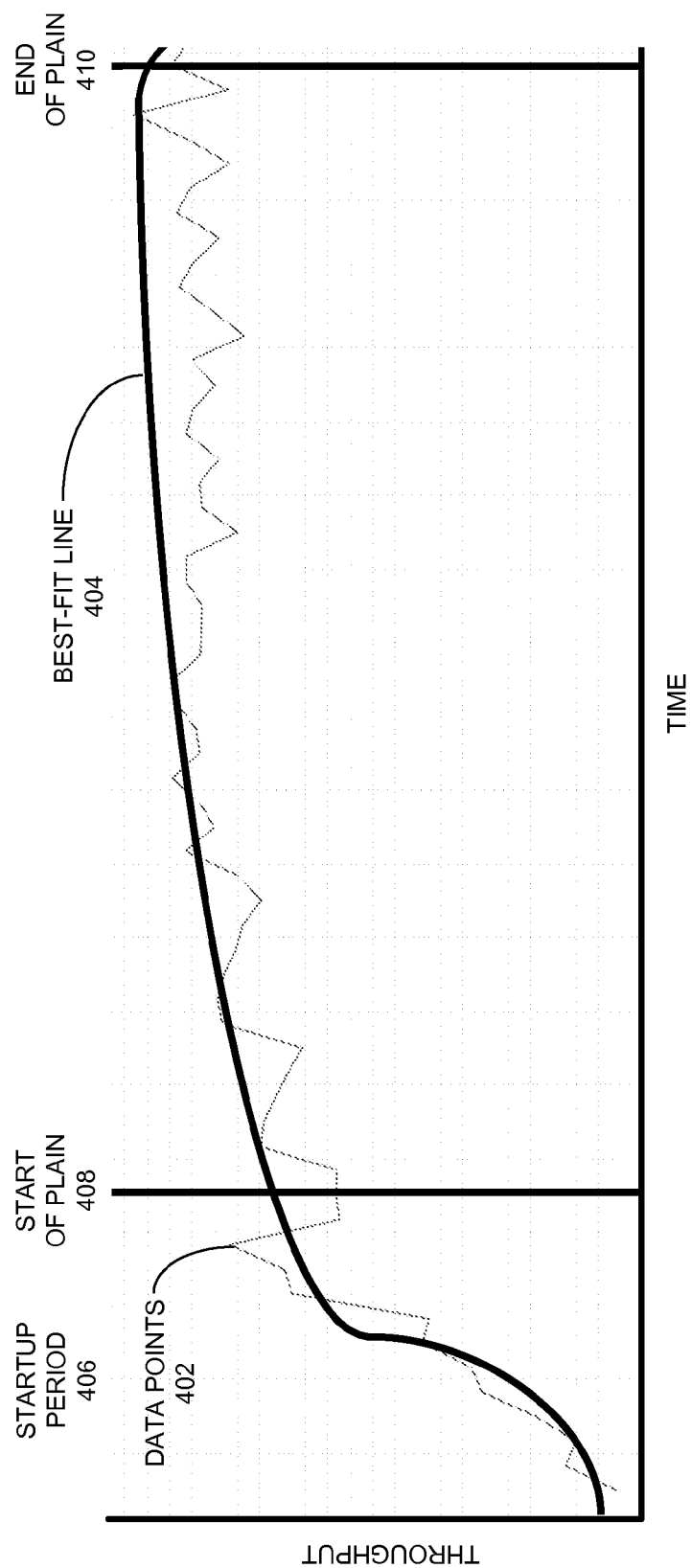
FIG. 4A presents a graph illustrating throughput for requests to a back-end system in accordance with the disclosed embodiments.

FIG. 4A presents a graph illustrating throughput for requests to a back-end system in accordance with the disclosed embodiments. This graph plots throughput versus time for one or more back-end systems. Moreover, this graph plots the data points 402 for the throughput as well as the associated best-fit line 404. The graph starts in a transitional startup period 406 when the throughput is ramping up. When the increase in throughput falls below a threshold value, this indicates a start of a plain 408. The system continues to monitor the throughput during the plain to detect abnormalities as described above. Any detected abnormalities are reported to a system administrator. Finally, when the throughput decreases by more than a threshold amount between two consecutive time periods, this indicates the end of the plain 410 and the associated back-end system is likely to be shutting down.

Latency Graph

Figure 4B:
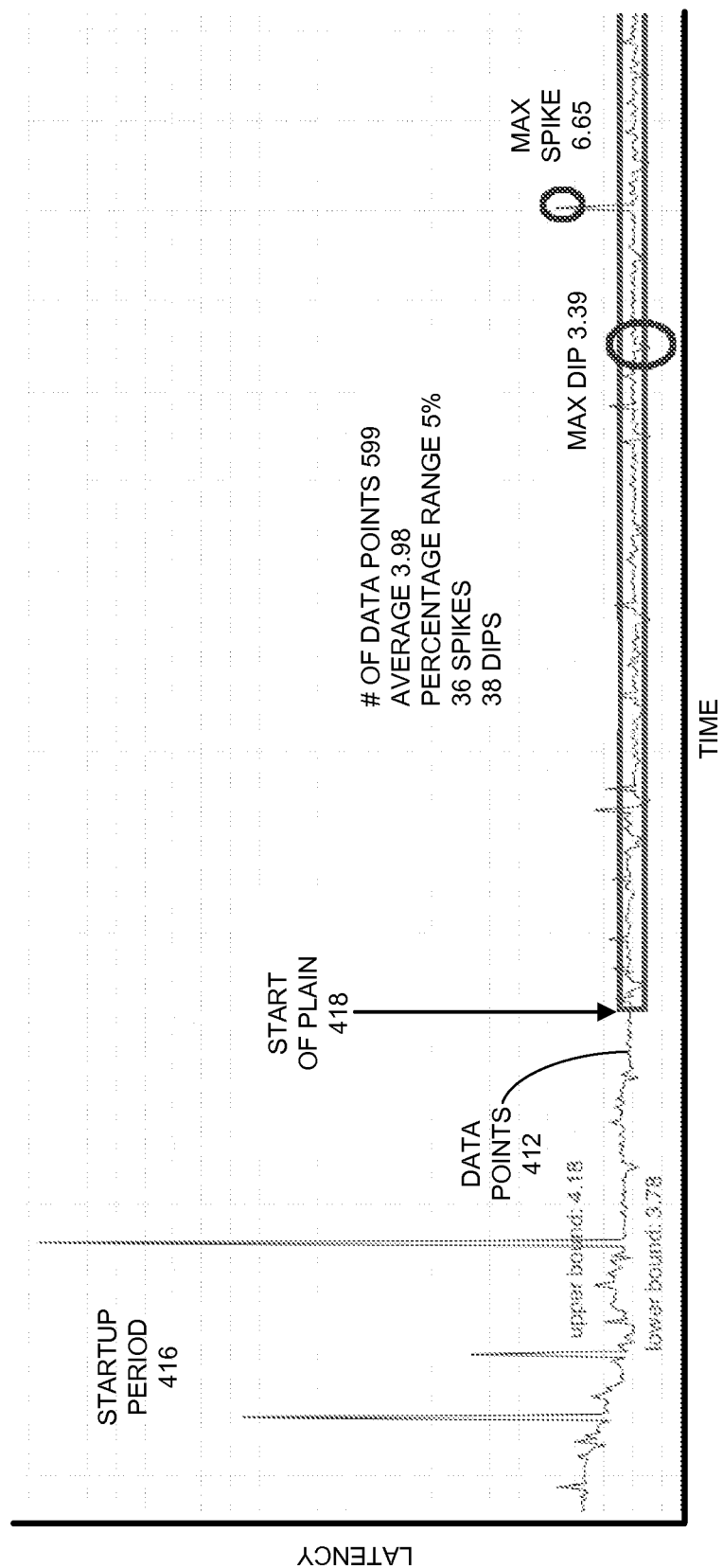
FIG. 4B presents a graph illustrating latency for requests to a back-end system in accordance with the disclosed embodiments.

FIG. 4B presents a graph illustrating latency for requests to a back-end system in accordance with the disclosed embodiments. This graph plots latency for processing request versus time for one or more back-end systems. In particular, this graph plots data points 412 for the latency but does not show the associated best-fit line. The graph starts in a transitional startup period 416 where the latency is decreasing. When the decrease in latency falls below a threshold value, this indicates a start of a plain 418. The system continues to monitor the latency during the plain to detect abnormalities as described above. Any detected abnormalities are reported to a system administrator. The end of the plain is not shown.

FIG. 4B also displays summary statistics for the latency, including one or more of the following: (1) the number of data points (599), (2) the average latency (3.98), (3) the percentage range for the abnormality threshold (5%), (4) the number of spikes in the plain (36), (5) the number of dips in the plain (38), (6) the value of a maximum dip in the plain (3.39), and (7) the value of the maximum spike in the plain (6.65).

The foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art. Additionally, the above disclosure is not intended to limit the disclosed embodiments. The scope of the disclosed embodiments is defined by the appended claims.

What is claimed is:

1. A computer-implemented method for detecting abnormalities in time-series data from an online professional network, the method comprising:
   receiving the time-series data, including at least one of throughput measurements and latency measurements associated with requests made to a back-end system associated with the online professional network;
   during a transitory startup period for the online professional network, detecting a start of a plain associated with steady-state behavior for requests made to the back-end system by,
      using a multi-degree polynomial to compute a best-fit line for throughput measurements for requests made to the backend system, and
      if an increase in throughput as indicated by the best-fit line falls below a threshold value, determining that the plain associated with steady state behavior has started;
   after the plain associated with steady state behavior has started, attempting to detect an abnormality by examining data points in the plain and looking for a deviation from the best-fit line; and
   upon detecting an abnormality in the time-series data in the plain,
      looking up associated system metrics which are temporally proximate to the abnormality, and
      generating a notification about the abnormality along with the associated system metrics to facilitate determining a root cause of the abnormality.

2. The computer-implemented method of claim 1, wherein the received time-series data is associated with one or more services that make requests to the back-end system in the online professional network.

3. The computer-implemented method of claim 2, wherein the one or more services includes one or more of the following:
   an email service;
   a search service;
   a service for accessing home pages;
   a service for accessing profile pages; and
   a service for interacting with mobile applications.

4. The computer-implemented method of claim 1, wherein looking up the associated system metrics comprises using a timestamp associated with the abnormality to scan log files containing the system metrics to identify metric values that are temporally proximate to the abnormality.

5. The computer-implemented method of claim 1, wherein the associated system metrics can includes one or more of the following:
   central-processing unit (CPU) usage;
   memory utilization;
   traffic to disk;
   active thread count;
   garbage-collection activity;
   heap utilization; and
   network traffic.

6. The computer-implemented method of claim 1, wherein detecting the abnormality involves detecting a dip in throughput for the requests made to the back-end system.

7. The computer-implemented method of claim 1, wherein detecting the abnormality involves detecting a spike in latency for the requests made to the back-end system.

8. The computer-implemented method of claim 1, wherein the method further comprises generating summary statistics for the time-series data, wherein the summary statistics include one or more of the following:
   an average value for the time-series data;
   a maximum value for the time-series data;
   a minimum value for the time-series data;
   a $90^{th}$ percentile value for the time-series data; and
   a $99^{th}$ percentile value for the time-series data.

9. A non-transitory computer-readable storage medium storing instructions that when executed by a computer cause the computer to perform a method for detecting abnormalities in time-series data from an online professional network, the method comprising:
   receiving the time-series data, including at least one of throughput measurements and latency measurements associated with requests made to a back-end system associated with the online professional network;
   during a transitory startup period for the online professional network, detecting a start of a plain associated with steady-state behavior for requests made to the back-end system by,
      using a multi-degree polynomial to compute a best-fit line for throughput measurements for requests made to the backend system, and
      if an increase in throughput as indicated by the best-fit line falls below a threshold value, determining that the plain associated with steady state behavior has started;
   after the plain associated with steady state behavior has started, attempting to detect an abnormality by examining data points in the plain and looking for a deviation from the best-fit line; and
   upon detecting an abnormality in the time-series data in the plain,
      looking up associated system metrics which are temporally proximate to the abnormality, and
      generating a notification about the abnormality along with the associated system metrics to facilitate determining a root cause of the abnormality.

10. The non-transitory computer-readable storage medium of claim 9, wherein the received time-series data is associated with one or more services that make requests to the back-end system in the online professional network.

11. The non-transitory computer-readable storage medium of claim 10, wherein the one or more services includes one or more of the following:
   an email service;
   a search service;
   a service for accessing home pages;
   a service for accessing profile pages; and
   a service for interacting with mobile applications.

12. The non-transitory computer-readable storage medium of claim 9, wherein looking up the associated system metrics comprises using a timestamp associated with the abnormality to scan log files containing the system metrics to identify metric values that are temporally proximate to the abnormality.

13. The non-transitory computer-readable storage medium of claim 9, wherein the associated system metrics includes one or more of the following:
- central-processing unit (CPU) usage;
- memory utilization;
- traffic to disk;
- active thread count;
- garbage-collection activity;
- heap utilization; and
- network traffic.

14. The non-transitory computer-readable storage medium of claim 9, wherein detecting the abnormality involves detecting a dip in throughput for the requests made to the back-end system.

15. The non-transitory computer-readable storage medium of claim 9, wherein detecting the abnormality involves detecting a spike in latency for the requests made to the back-end system.

16. The non-transitory computer-readable storage medium of claim 9, wherein the method further comprises generating summary statistics for the time-series data, wherein the summary statistics include one or more of the following:
- an average value for the time-series data;
- a maximum value for the time-series data;
- a minimum value for the time-series data;
- a $90^{th}$ percentile value for the time-series data; and
- a $99^{th}$ percentile value for the time-series data.

17. A system for detecting abnormalities in time-series data from an online professional network, comprising:
- a computing system comprising a processor and a memory;
- wherein the computing system is configured to,
  - receive the time-series data, including at least one of throughput measurements and latency measurements associated with requests made to a back-end system associated with the online professional network;
  - during a transitory startup period for the online professional network,
    - use a multi-degree polynomial to compute a best-fit line for throughput measurements for requests made to the backend system, and
    - if an increase in throughput as indicated by the best-fit line falls below a threshold value, determine that a plain associated with steady state behavior has started;
  - after the plain associated with steady state behavior has started, attempt to detect an abnormality by examining data points in the plain looking for a deviation from the best-fit line; and
  - upon detecting an abnormality in the time-series data in the plain,
    - look up associated system metrics which are temporally proximate to the abnormality; and
    - generate a notification about the abnormality along with the associated system metrics to facilitate determining a root cause of the abnormality.

18. The system of claim 17, wherein detecting the abnormality involves detecting a dip in throughput for the requests made to the back-end system.

19. The system of claim 17, wherein detecting the abnormality involves detecting a spike in latency for the requests made to the back-end system.

* * * * *

UNITED STATES PATENT AND TRADEMARK OFFICE
Certificate

Patent No. 8,661,299 B1                                                Patented: February 25, 2014

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Man Wai Ip, San Jose, CA (US) and Haricharan Ramachandra, Fremont, CA (US).

Signed and Sealed this Seventeenth Day of June 2014.

<div style="text-align:right">

JAMES KRAMER
*Supervisory Patent Examiner*
Art Unit 2113
Technology Center 2100

</div>